No. 793,429. Patented June 27, 1905.

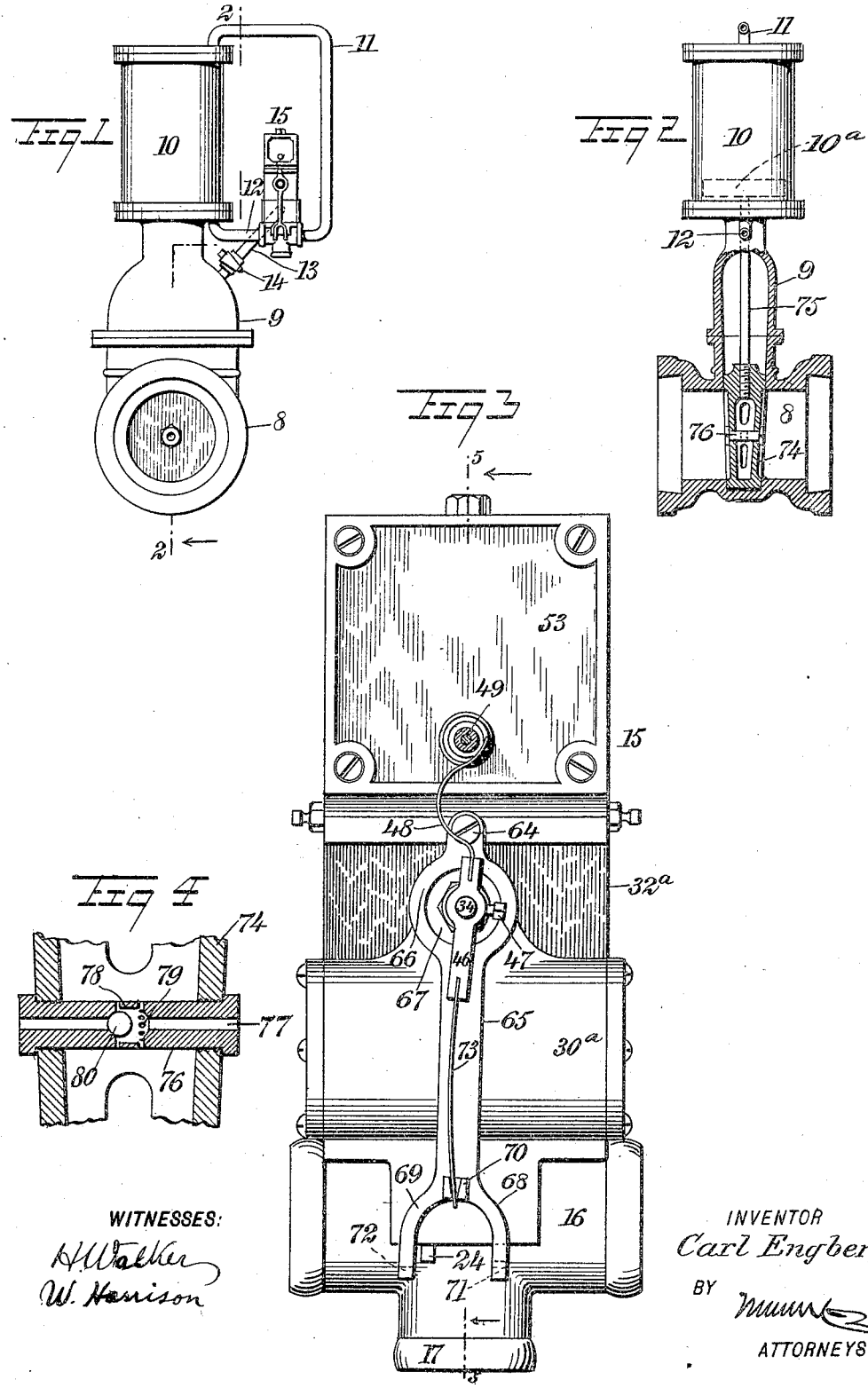

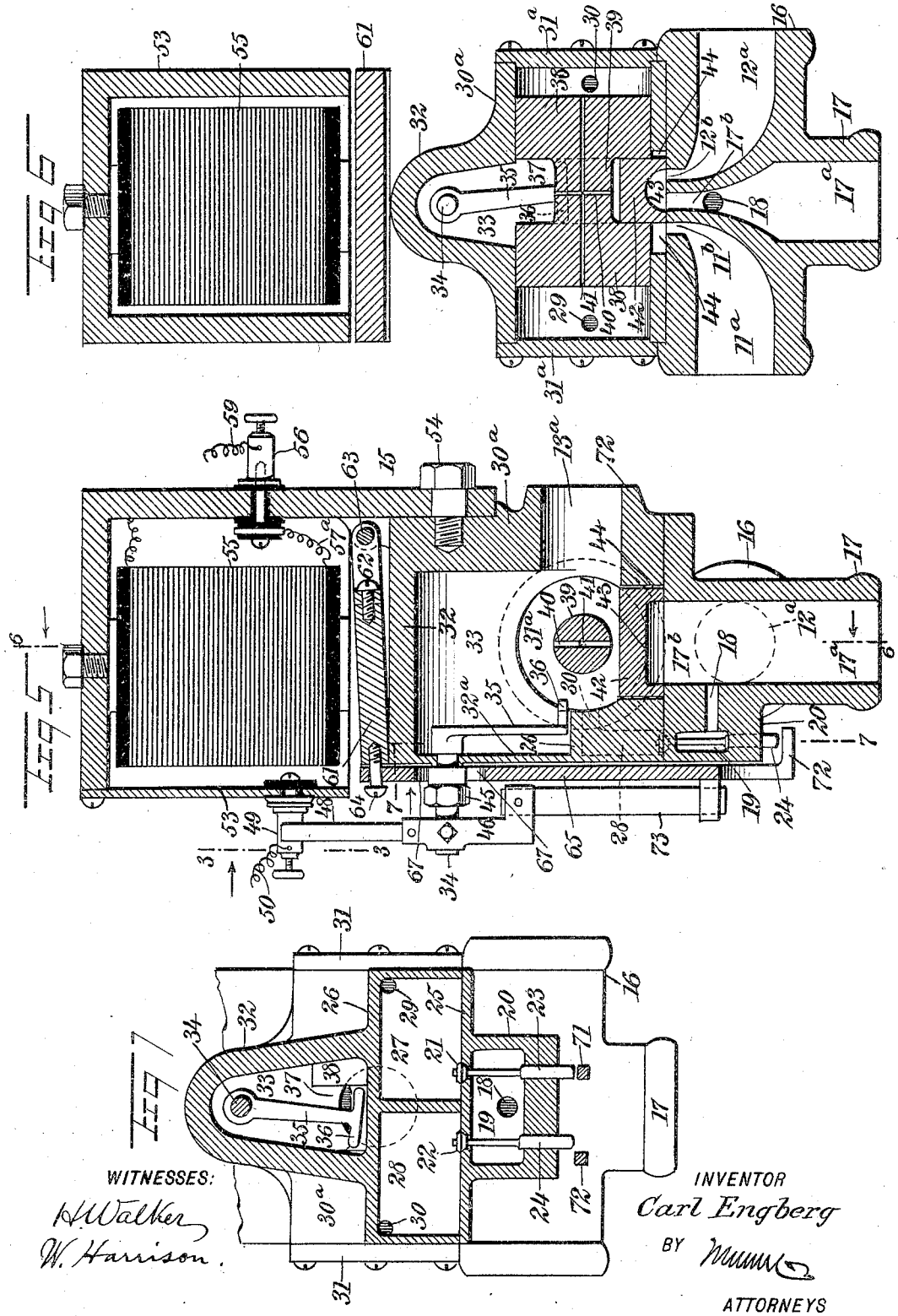

UNITED STATES PATENT OFFICE.

CARL ENGBERG, OF ST. JOSEPH, MICHIGAN, ASSIGNOR TO ENGBERG ELECTRIC AND MECHANICAL WORKS, OF ST. JOSEPH, MICHIGAN.

ELECTRICALLY-OPERATED HYDRAULIC VALVE.

SPECIFICATION forming part of Letters Patent No. 793,429, dated June 27, 1905.

Application filed February 23, 1904. Serial No. 194,702.

*To all whom it may concern:*

Be it known that I, CARL ENGBERG, a citizen of the United States, and a resident of St. Joseph, in the county of Berrien and State of Michigan, have invented a new and Improved Electrically-Operated Hydraulic Valve, of which the following is a full, clear, and exact description.

My invention relates to valves, my more particular object being to enable large and unwieldy valve-gates to be readily controlled, especially from a distance, and to apprise the operator of the condition of the valve.

Reference is to be had to the accompanying drawings, forming a part of this specification, in which similar characters of reference indicate corresponding parts in all the figures.

Figure 1 is a front elevation of a main valve equipped with my invention. Fig. 2 is a side elevation of the same, showing T-casing and certain other parts of the main valve in section on the line 2 2 in Fig. 1 looking in the direction of the arrow. Fig. 3 is a front view of the controlling mechanism for the valve, being a section upon the line 3 3 in Fig. 5 looking in the direction of the arrow. Fig. 4 is a fragmentary vertical section through a portion of the valve-gate. Fig. 5 is a central vertical section upon the line 5 5 in Fig. 3 looking in the direction of the arrows. Fig. 6 is a central vertical section upon the line 6 6 in Fig. 5 looking in the direction of the arrows, and Fig. 7 is a fragmentary section upon the line 7 7 in Fig. 5 looking in the direction of the arrow.

The casing of the main valve is shown at 8, the bonnet at 9, the hydraulic cylinder at 10, containing a piston $10^a$, pipes connected thereto for operating the same at 11 12, and a supply-pipe at 13, provided with a hand-valve 14 and leading to the controlling apparatus 15 from the bonnet 9, which is hollow and under water-pressure, as hereinafter described. The pipes 11 12 are rigidly connected with a T 16, (see Figs. 5, 6, and 7,) provided with a discharge-outlet 17 at its lower end, as shown. The discharge-pipe 17 is provided with a passage $17^a$, contracted at the point $17^b$, as indicated more particularly in Fig. 6. The T 16 is provided with passages $11^a$ $12^a$, into which are fitted the pipes 11 12. Communicating with the passage $17^a$ is a passage 18, connected with a compartment 19 within a box 20, as indicated in Figs. 5, 6, and 7. The compartment 19 is opened and closed by valves 21 22, these valves being mounted upon the respective stems 23 24, which extend downwardly through the bottom of the box 20, as indicated in Figs. 5 and 7. The valves 21 22 are seated upon the web 25, which forms the bottom of a box 26, provided with separate compartments 27 28, and from these compartments 27 28 short passages 29 30 lead directly into the cylinder $30^a$, as shown in Figs. 6 and 7. The cylinder $30^a$ is closed by heads $31^a$ and is water-tight. (See Fig. 6.)

Disposed above the box 26 is a dome 32, provided with a compartment 33, into which passes a rocking shaft 34, mounted upon the casing $32^a$. Rigidly connected with this rocking shaft is an arm 35, provided with a head 36 of the shape indicated in Fig. 7. A piston 38 is provided with an annular channel 37, encircling the middle thereof, thus giving the piston a shape approximating that of a dumb-bell. The head 36 loosely engages the channel 37, as indicated by dotted lines in Fig. 6 and by full lines in Fig. 7. Any sliding movement of the piston 38 communicates an angular or rocking movement to the arm 35 and shaft 34. The portion 39 of the piston encircled by the annular channel 37 is cylindrical, as indicated in Fig. 5. The piston is perforated by a small vertical passage 40 and by a small horizontal passage 41, these passages preferably communicating with each other. The purpose of these passages is to equalize trivial pressures upon different parts of the piston, so that no part of the mechanism will be subjected to strain or liable to accidental movement, and the piston will only move when a considerable pressure is thrown upon one of its ends. A slide-valve of the so-called "D" pattern is shown at 42 and is provided with a port 43. This valve slides within a space 44 and is engaged by the piston 38 in such manner that the annular channel 37 is neatly fitted over the slide-valve 42. Any movements of the piston 38 therefore necessarily slide the valve 42 and open and close the passages $11^a$ $12^a$, as will be seen from Fig. 6.

An arm 46 is rigidly connected with the shaft 34 and is free to turn when this shaft is rotated. Mounted upon the upper end of this arm is a contact-spring 48, which may be pressed into engagement with a binding-post 49 when the arm 46 is rocked into one of its extreme positions. A wire 50 is connected with the binding-post 49 and leads off to the operator's station, being there connected with an alarm for the purpose of apprising the operator of the closing of the contact.

An electromagnet 55 is mounted in a casing 53 and is connected with a binding-post 56 by means of a wire $57^a$, as shown in Fig. 5, this binding-post being in turn connected with a wire 59. The purpose of the magnet 55 and of the electrical connections therefor is to enable the distant operator to energize the magnet 55 at will. The armature of the magnet is shown at 61 and is mounted upon a hinge 62, connected with a pivot 63, being thereby free to swing. The outer end of the armature is provided with a pivotal screw 64, from which depends an arm 65. This arm is provided with an enlarged portion 66, having a central aperture 67. The lower end of the arm 65 is provided with separate prongs 68 69, which have lugs 71 72, projected at a right angle therefrom, as indicated in Figs. 3 and 5. A leaf-spring 73 is connected with arm 46 and loosely engages a bearing 70, this bearing being integral with the arm 65.

The main-valve gate is shown at 74 and is controlled by means of a vertically-movable stem 75 in the usual manner. A tube 76 passes directly through the main-valve gate 74, as indicated in Fig. 4. This tube is provided with a small longitudinal passage 77 and is mutilated so as to form a cage 78, provided with perforations 79. A loose ball 80 is mounted within this cage and is free to close either end of the passage 77, as indicated in Fig. 4, according to the direction of the water-pressure exerted upon the main-valve gate.

The operation of my device is as follows: Suppose that the main-valve gate is closed and that, as usual, the water-pressure is greater upon one side of the main gate 74 than upon the other side. The tendency of the water to escape through the passage 77 moves the ball 80 and obstructs this passage as indicated in Fig. 4. The water escapes through the perforation 79 into the bonnet 9 and thence (the hand-valve 14 being open) through the pipe 13 and into the passage-way $13^a$. The liquid finds its way through the passages 40 and 41 of the piston, but is unable to escape through the passages 29 30 into the compartments 27 28 for the reason that the valves 21 and 22 are closed, as indicated in Fig. 7. In other words, the water being unable to get out is unable to move the piston 38, and should there be a slight initial difference in pressure upon different parts of the piston the same is equalized by the small passages 40 and 41. Suppose, now, that the operator desires to open the main valve. He knows that when the valve is closed the arm 65 occupies the position indicated in Fig. 3 and that the lug 71 is directly beneath the valve-stem 23. He then energizes the electromagnet 55, causing it to raise the armature 61. The arm 65 is thus raised bodily upward and the lug 71 lifts the valve-stem 23, opening the valve 21. This opening of the valve allows the escape of water from the compartment 27 into the compartment 19 and thence through the passage or vent 18 and the passage $17^a$ to the ground. This allows the water to escape freely for an instant through the passage 29 and out of the cylinder $30^a$, whereas the water in the passage 30, being under pressure and having no escape, drives the piston 38 to the opposite end of the cylinder—that is to say, to the end indicated at the right of Fig. 6. This movement of the piston 38 also moves the slide-valve 42 to the left, breaking the connection between the port $12^b$ and the passage $12^a$ and making connection with the port $11^b$ and the passage $11^a$. This causes water to flow through the pipe 11, passage $11^a$, port $11^b$, and port 43 to the passage $17^b$. This allows the escape of the water from the upper portion of the cylinder 10 and leaves the piston $10^a$ free to move vertically upward in the cylinder 10, thereby opening the main-valve gate. The same motion allows water to pass directly from the space 44, through the port 43, the port $12^b$, and the passage $12^a$, to the pipe 12, and thence to the lower end of the cylinder 10, thereby forcing the piston therein upward and opening the main-valve gate. The movement of the piston just described, incidental to the opening of the main-valve gate, causes the arm 35 to rock slightly in a contra-clockwise direction, as indicated in Fig. 3, forcing the spring 73 to the extreme right, and thus bringing the lug 72 under the stem 24. This rocking movement of the arm 35 also causes the contact-spring 48 to engage the binding-post 49, these members 48 49 constituting a contact to be connected with a distant alarm for apprising the operator that the main valve is open. To close the main valve, the operator energizes the magnet 55, thereby causing the armature 61 to rise again and lift the arm 65. The lug 72 thereupon raises the stem 24, thus opening the valve 22. This allows water to escape through the passage 30, compartment 28, compartment 19, and passage 18 into the discharge-outlet $17^a$, thereby relieving the pressure upon that end of the piston shown to the right of Fig. 6. The water-pressure exerted upon the left-hand end of the piston, as seen in Fig. 6, forces the piston to the right, as shown in this figure, thereby causing the arm 46 to assume the position indicated in Fig. 3, the spring 73 thereupon causing the arm 65 to move into the position indicated also in Fig. 3, so that the lug 71 is now ready to lift the stem 23 and allow the valve to be opened.

As the spring-contact 48 only engages the binding-post 49, also serving as a contact member when the main-valve gate is raised so that the valve is open, the operator always has knowledge as to the general condition of the main valve, whether opened or closed. It will be seen, therefore, that the mechanism above described operates the same way, no matter whether the water be flowing through the main valve in the one direction or the other. If the water flows through the T 16 in the opposite direction, the ball 80 (shown in Fig. 4) merely shifts to the right instead of to the left, as seen in that figure, the water-pressure being at all times exerted through the bonnet 74 and the pipe 13. By this arrangement only a single pipe 13 is needed for supplying the valve-operating mechanism with water, no matter what may be the general course of the water flowing through the main valve or how often the direction of flow may be reversed through extrinsic causes.

I do not limit myself to the particular construction of the magnet shown, as any other magnetic member may be employed. Neither do I limit myself in all instances to the use of a magnetic member. The several mechanical details may be changed considerably without departing from the spirit of my invention.

Having thus described my invention, I claim as new and desire to secure by Letters Patent—

1. In an apparatus of the character described, the combination of a main valve provided with a valve-gate and with a bonnet, hydraulic mechanism for opening and closing said valve-gate, means for admitting water under pressure into said bonnet, and a connection between said bonnet and said hydraulic mechanism for the purpose of actuating said hydraulic mechanism by water from said bonnet.

2. In an apparatus of the character described, the combination of a main valve provided with a valve-gate and with a bonnet, hydraulic mechanism connected with said bonnet and actuated by water-pressure therefrom, and mechanism controllable automatically by pressure of the water, for maintaining said bonnet always under pressure regardless of the general direction of flow of the water through said main valve.

3. In an apparatus of the character described, the combination of a main valve provided with a gate, said gate being provided with a passage extending through the same, a valve connected with said passage and actuated by pressure of the water therethrough, for the purpose of causing said water to exert a pressure within said bonnet, and hydraulic mechanism connected directly with said bonnet and actuated by water-pressure therefrom.

4. In valve mechanism for hydraulic apparatus, the combination of a motor-piston, a motor-cylinder therefor, passages in communication with opposite ends of said cylinder, valves for controlling said passages, an actuator for said valves, an operating-lever for the actuator connected with the motor-piston for movement therewith, a spring connection between the said operating-lever and the actuator to effect a movement of the same in opposite directions, and means for moving the said actuator longitudinally, substantially as and for the purpose set forth.

5. In valve mechanism for hydraulic apparatus, the combination of a motor-piston, a motor-cylinder, valve-controlled passages in connection with opposite ends of said motor-cylinder, an actuator forked at one end and having lateral extensions for actuation of the valves controlling communication through the aforesaid passages, an operating-lever for the actuator connected with the motor-piston for movement therewith, a spring connection between the operating-lever and the actuator, and means for electrically operating said actuator, substantially as and for the purpose specified.

6. The combination of a piston, a main valve actuated thereby, sliding valve mechanism for controlling said main valve, said sliding valve mechanism being provided with an exhaust-passage, a pair of separate valves for controlling said exhaust-passage so as to govern said sliding valve mechanism, a movable member for alining with one or the other of said last-mentioned valves, and electrical mechanism controllable at will from a distance for moving said member when the same is in alinement with one of said last-mentioned valves.

7. The combination of a cylinder, a piston fitting the same, sliding valve mechanism connected with said cylinder and controlling said piston, said sliding valve mechanism having an exhaust-passage, a plurality of separate valves for controlling said exhaust-passage and governing said sliding valve mechanism, a swinging arm actuated by said sliding valve mechanism and provided with portions adapted to aline with said last-mentioned valves one at a time, mechanism electrically operated from a distance for lifting said arm bodily so as to actuate one or the other of said last-mentioned valves, and a contact closed by movements of said arm for energizing an alarm-circuit when said arm assumes a certain predetermined position.

8. The combination of a cylinder, a piston fitting the same, sliding valve mechanism connected with said cylinder for controlling said piston, said sliding valve mechanism having an exhaust-passage, a plurality of separate valves for controlling said exhaust-passage and thereby controlling said sliding valve mechanism, a swinging arm actuated by said sliding valve mechanism and provided with portions adapted to aline with said last-mentioned valves one at a time, an armature connected with said swinging arm for moving the same when attracted so as to actuate the valve in alinement therewith, and an electromagnet disposed adjacent to said armature and controllable at will from a distance for attracting said armature.

In testimony whereof I have signed my name to this specification in the presence of two subscribing witnesses.

CARL ENGBERG.

Witnesses:
    IVA NIECE,
    LAWRENCE C. FYFE.